United States Patent
Federspiel et al.

(10) Patent No.: US 6,948,750 B2
(45) Date of Patent: Sep. 27, 2005

(54) COLLISION SENSOR FOR VEHICLE BUMPER

(75) Inventors: Laurent Federspiel, Muensbach (LU); Philippe Boyer, Cattenom (FR); Christian Bour, Domprix (FR)

(73) Assignee: IEE International Electronics & Engineering S.A., Echternach (LU)

( * ) Notice: Subject to any disclaimer, the term of this patent is extended or adjusted under 35 U.S.C. 154(b) by 74 days.

(21) Appl. No.: 10/721,409

(22) Filed: Nov. 26, 2003

(65) Prior Publication Data

US 2005/0121925 A1    Jun. 9, 2005

(51) Int. Cl.[7] .............................................. B60R 19/22
(52) U.S. Cl. ....................... 293/109; 293/120; 280/735
(58) Field of Search ................. 293/109, 120, 293/133, 132, 102, 187.09, 128; 340/435; 180/274, 282, 275; 296/203.02; 280/735, 280/734; 701/45, 301; 702/143

(56) References Cited

U.S. PATENT DOCUMENTS

| | | | |
|---|---|---|---|
| 3,618,117 A * | 11/1971 | Kaiser ......................... | 280/735 |
| 3,842,930 A * | 10/1974 | Fiala ........................... | 280/735 |
| 4,103,400 A | 8/1978 | Munse | |
| 4,268,079 A * | 5/1981 | Nomura et al. ............. | 293/120 |
| 4,325,574 A * | 4/1982 | Umemoto et al. .......... | 293/120 |
| 4,363,839 A * | 12/1982 | Watanabe et al. ........... | 293/128 |
| 4,399,887 A * | 8/1983 | Okada ......................... | 280/735 |
| 4,594,485 A * | 6/1986 | Brown, Jr. ........... | 200/61.45 R |
| 5,106,137 A * | 4/1992 | Curtis ......................... | 293/109 |
| 5,392,024 A * | 2/1995 | Kiuchi et al. ............... | 280/735 |
| 5,487,559 A * | 1/1996 | Headley ..................... | 280/735 |
| 5,826,216 A * | 10/1998 | Lyons et al. ................ | 702/143 |
| 6,225,891 B1 * | 5/2001 | Lyons et al. ................ | 340/435 |
| 6,561,301 B1 * | 5/2003 | Hattori et al. .............. | 280/734 |
| 6,607,212 B1 * | 8/2003 | Reimer et al. .............. | 280/735 |
| 6,637,788 B1 * | 10/2003 | Zöllner et al. .............. | 293/107 |
| 6,755,452 B2 * | 6/2004 | Cate et al. .................. | 293/120 |

FOREIGN PATENT DOCUMENTS

| | | |
|---|---|---|
| DE | 28 15 263 | 10/1979 |
| DE | 38 02 527 A1 | 8/1988 |
| DE | 195 37 373 A1 | 4/1997 |
| WO | WO 97/48578 | 12/1997 |

* cited by examiner

Primary Examiner—Kiran B. Patel
(74) Attorney, Agent, or Firm—Oblon, Spivak, McClelland, Maier & Neustadt, P.C.

(57) ABSTRACT

A collision sensor comprises a sensing element to be arranged on a vehicle bumper element, and an elastic profile. The elastic profile comprises at least one hollow chamber for accommodating said sensing element and at least one clip means for positively interlocking with a corresponding locating means of said vehicle bumper element.

16 Claims, 1 Drawing Sheet

COLLISION SENSOR FOR VEHICLE BUMPER

Figure 1:
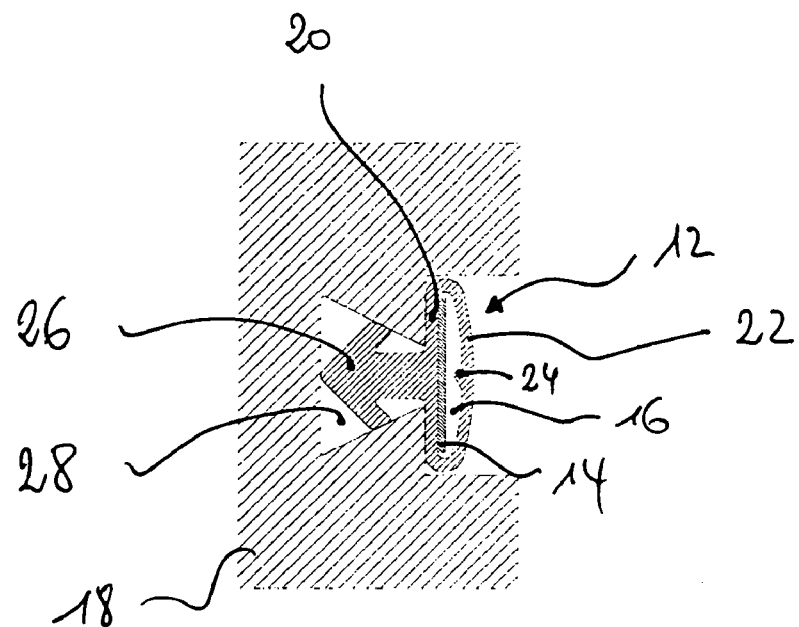

The present invention generally relates to a collision sensor for a vehicle bumper to be used e.g. in a pedestrian protection system and more specifically to a pedestrian protection sensor, i.e. a device for the detection of a pedestrian/car collision for use in a pedestrian protection system.

In the recent years, some vehicle manufacturers have started developing safety systems for automotive vehicles, which should help to protect pedestrians in case of a car/pedestrian collision. Such safety systems comprise one or more active systems, which are designed to minimize the impact violence of the pedestrian on the vehicle structure such as the engine hood. It is clear that an efficient control of such active systems requires reliable sensing devices, which are able to timely sense the presence of a car/pedestrian collision.

These collision sensors usually comprise sensing elements having at least one measurable property, which varies with a deformation or activation of the sensing element. Such sensing elements may e.g. comprise optical fibre sensing elements or force sensing elements. In order to ensure a reliable detection of a collision condition, these collision sensors have to be mounted on the vehicle front bumper in a forward facing region of the bumper. The sensors should e.g. be mounted below the bumper plastic or metal skin on the bumper foam core. The collision sensors have to be securely fastened to the bumper foam in order to ensure a reliable operation of the sensor during the vehicle's service life. Thereby the fastening has to withstand the rough environmental conditions prevailing below the bumper skin.

OBJECT OF THE INVENTION

Thus there is a need for a collision sensor, which is reliably fastenable to the vehicle bumper.

GENERAL DESCRIPTION OF THE INVENTION

In order to achieve the abovementioned object, the present invention proposes a collision sensor comprising at least one sensing element to be arranged on a vehicle bumper element, and an elastic profile. The elastic profile comprises at least one hollow chamber for accommodating said sensing element and at least one clip means for positively interlocking with a corresponding locating means of said vehicle bumper element. The present invention further proposes a vehicle bumper with integrated collision sensor, wherein the vehicle bumper comprises a bumper foam core and wherein said collision sensor comprises a sensing element to be arranged on said bumper foam core. The collision sensor comprises an elastic profile, said elastic profile comprising at least one hollow chamber for accommodating said sensing element and at least one clip means for positively interlocking with a corresponding locating means of said bumper foam core.

The collision sensor of the present invention comprises an elastic accommodation profile, which enables the sensing element to be mechanically connected to the vehicle bumper element. The sensing element is received by the elastic profile and attached by means if the clip means of the elastic profile to the bumper element.

The sensing element and the elastic profile may be provided as a prefabricated unit to the bumper assembly station. At the bumper assembly station, the assembly of the collision sensor is achieved simply by clipping the elastic profile to the locating means of the bumper element. This assembly does neither require specific assembly tools nor any further mounting elements such as supplemental clips or glue or the like. Thus the design of the collision sensor of the present invention ensures a fast and reliable assembly with the vehicle bumper which results in low production costs. In addition, the clip mounting of the elastic profile to the bumper element enables the removal of the elastic profile without deterioration of the bumper structure. Thus the clip means of the present collision sensor ensures a high serviceability of the collision sensor, which may be easily replaced in case of failure e.g. of the sensing element. The skilled person will understand, that a single elastic profile could be used for accommodating two or more different sensing elements. These sensing elements may be accommodated in a single hollow chamber or each of the sensing elements may be arranged in a different hollow chamber of the same elastic profile.

It will be noted that the interaction of the clip means of the elastic profile and the locating means of the bumper result in a flexible mechanical connection between the two parts. Such a flexible mechanical connection is very resistant to temperature variations, vibrations and other rough environmental conditions prevailing at the vehicle bumper. This ensures a very robust connection of the collision sensor to the vehicle bumper which lasts during the entire service life of the collision sensor.

It will be appreciated, that the profile also protects the sensing element against environmental effects such as water splashing, dampness, dust etc. The elastic profile thus is preferably closed or sealed at both extremities in order to prevent the penetration of dust and moisture into the hollow chamber.

The interior design of the hollow chamber is preferably adapted to the geometry of the respective sensing element. This ensures a reliable positioning of the sensing element with respect to the vehicle bumper element.

It will be appreciated, that the sensing element should preferably have a measurable property which varies in accordance with a pressure acting on the sensing element or with a deformation of the sensing element. In operation, the sensing elements are connected (by means of cabling or a wireless link) to a control unit which senses the variable property in order to detect a deformation the sensing element. The sensing element may e.g. comprise pressure sensing devices such as force sensing elements, the electrical resistance of which depends on the pressure acting on the sensing element, or surface acoustic wave pressure sensors. Alternatively the sensing element may comprise optical fibre sensors, the optical transmittivity of which varies with a deformation of the element.

In a preferred embodiment, the elastic profile comprises a base section, which, in use, is directed towards said vehicle bumper element, and wherein said clip means is arranged on said base section of said elastic profile. In use, the base preferably section rests against said bumper foam core, so that a correct positioning of the collision sensor with respect to the bumper foam core is achieved.

The elastic profile further comprises a front section opposite of said base section. In use, the front section faces away from said vehicle bumper element and accordingly receives the impact from a pedestrian or an object in case of a crash. The front section accordingly has to be highly flexible in order to transmit the collision forces acting on the bumper to the sensing element inside the hollow chamber. It will be noted that the interior design of the front section may be optimized for the transmission of the collision forces to the sensing element.

The base section comprises preferably a higher rigidness than said front section. As a result, the base section provides a reliable support surface which is necessary for an optimized transmission of the collision forces onto the sensing element. As such the harder base section may compensate for production tolerances at the boundary of two foam parts and ensure a reliable operation of the collision sensor in these boundary regions.

The elastic profile is advantageously an extruded elastomer profile. Such extruded profiles may be produced in a wide range of forms at very low costs. The different hardness of a front section and a base section of the profile may be provided e.g. by coextrusion of different elastomer materials.

It will be noted that the length of the elastic profile is easily adaptable to the specific requirements of the collision sensor. A possible embodiment of a vehicle bumper comprises e.g. several collision sensors, each of which is arranged in a specific region of the bumper and responsive to collision forces acting in this specific region. In this case, the length of the elastic profile will correspond substantially to the width of the specific regions of the vehicle bumper. In a different embodiment, said elastic profile has a length which is substantially equal to a width of a vehicle bumper, such that after the assembly of said collision sensor on said bumper, said elastic profile extends substantially along the entire width of said vehicle bumper.

The elastic profile usually comprises an elongated form and said clip means extends preferably substantially along an entire length of said elastic profile. In this case, the locating means of the bumper preferably comprises an elongated groove extending along at least a part of the bumper foam core.

In a possible embodiment, the clip means comprises a rearward extending web having a cross section in the form of a barbed arrow, while said groove has a trapezoidal cross section, the base of said trapezoidal cross section being located inside said foam core. Such a "barbed arrow" or "pine-tree" design together with a suitable form of the locating means enables an optimal mechanical connection with the car bumper structure.

DETAILED DESCRIPTION WITH RESPECT TO THE FIGURES

Figure 2:
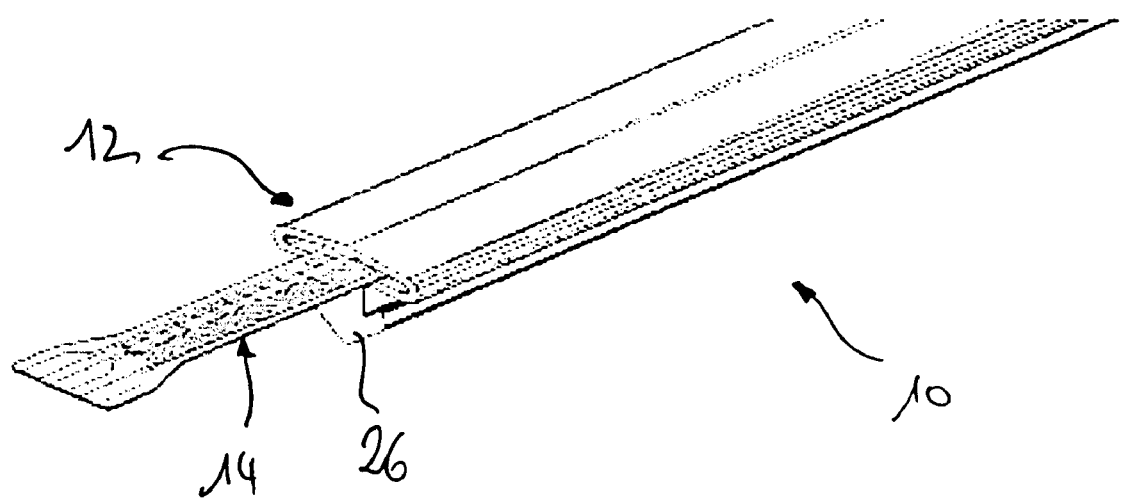

The present invention will be more apparent from the following description of several not limiting embodiments with reference to the attached drawings, wherein FIG. 1: shows a cross sectional view of a vehicle bumper foam core with integrated collision sensor;

FIG. 2: shows a perspective view of the collision sensor.

The collision sensor 10 shown in FIGS. 1 and 2 substantially comprises an elastic hollow profile 12 and a sensing element 14. The shown sensing element 14 comprises a force sensing resistor element, the electrical resistance of which depends on the pressure acting on the sensing element. It will however be appreciated, that different sensing elements may be used within the context of the present invention.

The elongated elastic profile 12 comprises a hollow chamber 16 for accommodating said sensing element 14. The interior design of the hollow chamber 16 is adapted to the geometry of the respective sensing element 14. This ensures a reliable positioning of the sensing element with respect to the vehicle bumper foam core 18, onto which the collision sensor 10 should be mounted.

The elastic profile 12 comprises a base section 20, which, in use, is directed towards said vehicle bumper foam core 18 and a front section 22 opposite of said base section 20. In use, the front section faces away from said vehicle bumper foam 18 and accordingly receives the impact from a pedestrian or an object in case of a crash. The front section 22 of the elastic profile 12 is made of a highly flexible material in order to transmit the collision forces acting on the bumper to the sensing element inside the hollow chamber. It will be noted that the interior design of the front section may be optimized for the transmission of the collision forces to the sensing element, e.g. by providing a switching nose 24 on the interior surface of the hollow chamber.

The base section 20 comprises preferably a higher rigidness than said front section 22. As a result, the base section 20 provides a reliable support surface which is necessary for an optimized transmission of the collision forces onto the sensing element 14.

In order to assemble the collision sensor 10 on the vehicle bumper foam 18, the elastic profile 12 comprises a clip means 26, which is designed for positively interlocking with a corresponding locating means 28 of said vehicle bumper foam 18. The clip means 26 preferably comprises a rearward extending web arranged on said base section 20 of said elastic profile 12, said web having a cross section in the form of a barbed arrow or pine-tree. The locating means on the other hand preferably comprise an elongated groove having a trapezoidal cross section, the base of said trapezoidal cross section being located inside said foam core. Such a "barbed arrow" or "pine-tree" design together with a suitable form of the locating means enables an optimal mechanical connection with the car bumper foam.

LIST OF REFERENCE NUMERALS

10 collision sensor
12 elastic hollow profile
14 sensing element
16 hollow chamber
18 bumper foam core
20 base section
22 front section
24 switching nose
26 clip means
28 locating means

What is claimed is:

1. A collision sensor comprising at least one sensing element to be arranged on a vehicle bumper element and an elastic profile, said elastic profile comprising at least one hollow chamber for accommodating said sensing element and at least one clip means for positively interlocking with a corresponding locating means of said vehicle bumper element.

2. The collision sensor according to claim 1, wherein said elastic profile comprises a base section which, in use, is directed towards said vehicle bumper element, and wherein said clip means is arranged on said base section of said elastic profile.

3. The collision sensor according to claim 2, wherein said elastic profile comprises a front section opposite of said base section, and wherein said base section comprises a higher rigidness than said front section.

4. The collision sensor according to claim 1, wherein said elastic profile is an extruded elastomer profile.

5. The collision sensor according to claim 1, wherein said elastic profile has a length which is substantially equal to a width of a vehicle bumper, such that after the assembly of said collision sensor on said bumper, said elastic profile extends substantially along the entire width of said vehicle bumper.

6. The collision sensor according to claim 1, wherein said elastic profile comprises an elongated form and wherein said clip means extends substantially along an entire length of said elastic profile.

7. The collision sensor according to claim 1, wherein said clip means comprises a rearward extending web having a cross section in the form of a barbed arrow.

8. A vehicle bumper with integrated collision sensor, said vehicle bumper comprising a bumper foam core and said collision sensor comprising a sensing element to be arranged on said bumper foam core, said collision sensor further comprising an elastic profile, said elastic profile comprising at least one hollow chamber for accommodating said sensing element and at least one clip means for positively interlocking with a corresponding locating means of said bumper foam core.

9. The vehicle bumper according to claim 8, wherein said elastic profile comprises a base section resting against said bumper foam core, and wherein said clip means is arranged on said base section of said elastic profile.

10. The vehicle bumper according to claim 9, wherein said elastic profile comprises a front section opposite of said base section, and wherein said base section comprises a higher rigidness than said front section.

11. The vehicle bumper according to claim 8, wherein said elastic profile is an extruded elastomer profile.

12. The vehicle bumper according to claim 8, wherein said elastic profile has a length which is substantially equal to a width of said vehicle bumper and extends substantially along the entire width of said vehicle bumper.

13. The vehicle bumper according to claim 8, wherein said elastic profile comprises an elongated form and wherein said clip means extends substantially along an entire length of said elastic profile.

14. The vehicle bumper according to claim 8, wherein said clip means comprises a rearward extending web having a cross section in the form of a barbed arrow.

15. The vehicle bumper according to claim 8, wherein said locating means of said bumper foam core comprises a groove extending along at least a part of the bumper foam core.

16. The vehicle bumper according to claim 15, wherein said groove has a trapezoidal cross section, the base of said trapezoidal cross section being located inside said foam core.

* * * * *